United States Patent [19]

Hüttinger et al.

[11] Patent Number: 4,528,971

[45] Date of Patent: Jul. 16, 1985

[54] IGNITION COIL CABLE CONNECTION ARRANGEMENT FOR AN INTERNAL COMBUSTION ENGINE

[75] Inventors: Manfred Hüttinger, Oberasbach; Horst-Günter Steffen, Schwarzenbruck; Karl-Heinz Völkel, Nuremberg; Karl Wutz, Neumarkf, all of Fed. Rep. of Germany

[73] Assignee: Robert Bosch GmbH, Stuttgart, Fed. Rep. of Germany

[21] Appl. No.: 436,626

[22] Filed: Oct. 25, 1982

[30] Foreign Application Priority Data

Feb. 18, 1982 [DE] Fed. Rep. of Germany ....... 3205714

[51] Int. Cl.³ ...................... H04B 3/28; H01R 17/04; F02D 11/00

[52] U.S. Cl. ................................ 123/634; 339/221 R; 339/192 T; 336/105

[58] Field of Search ................ 123/634, 635; 339/192, 339/221 R, 221 M, 103 B, 106, 192 T; 336/105

[56] References Cited

U.S. PATENT DOCUMENTS

| | | | |
|---|---|---|---|
| 2,718,625 | 9/1955 | Harrison | 339/192 T |
| 3,935,852 | 2/1976 | Donovan et al. | 123/635 |
| 4,059,330 | 11/1977 | Shirey | 339/221 R |
| 4,105,007 | 8/1978 | Mochimaru | 123/634 |
| 4,181,387 | 1/1980 | Walters | 339/221 R |
| 4,286,837 | 9/1981 | Yasutake et al. | 339/221 R |

*Primary Examiner*—Raymond A. Nelli

*Attorney, Agent, or Firm*—Frishauf, Holtz, Goodman & Woodward

[57] ABSTRACT

To eliminate welded or soldered connections between the fine or thin secondary wire (18, 18*a*) of an ignition coil and the high-voltage terminal plug, the high-voltage terminal arrangement includes a tubular stub (19) having a conical opening (29) therein, within which the end portion (18*a*) of the secondary wire can be placed, preferably in form of twisted-together loops (28), and the connection is effected by a screw machine part (30) in form of a conical plug, press-fitted within the conical opening, and making electrical connection with the twisted wire, while being retained securely within the stub (19). After insertion, the plug, the primary and secondary windings, and the core can all be molded or potted by being surrounded with a plastic injection molding or a potting compound. The twisted wire ends can be pre-tinned, and the surface of the plug smooth; or the surface of the plug can be knurled, stippled or ridged to bite through magnet wire insulation.

12 Claims, 2 Drawing Figures

IGNITION COIL CABLE CONNECTION ARRANGEMENT FOR AN INTERNAL COMBUSTION ENGINE

The present invention relates to internal combustion engines, and more particularly to small internal combustion engines using a magneto ignition system, for example suitable for chain saws, lawn mowers, or the like, although being applicable to various types of other ignition systems as well.

BACKGROUND

Ignition systems in which a spark coil has a terminal tubular hollow stub for connection to a spark plug cable are well known. In accordance with many ways of manufacture, one of the winding ends of the secondary of the ignition coil has a contact terminal soldered, brazed or welded thereon which then is secured within the connecting stub, for example by a press fit, by being molded in the connecting stub, or the like (see, for example, German Patent Disclosure Document DE-OS No. 26 51 218). It has also been proposed to solder the secondary winding of a magneto armature to a contact element which, after the soldering and hence the connecting step, is then coated with insulating material, for example by injection-molding the assembly, which also surrounds the transformer winding of the magneto armature, so that, in a single plastic working step, the connecting stub for the ignition cable, as well as placement of the connecting element can be made, see, for example, German Patent Disclosure Document DE-OS No. 23 38 925.

It has been found that the additional soldering, welding or brazing connection of the end portion of the secondary wire to the contacting element requires a connecting step which unduly complicates manufacture of the ignition coil or ignition structure assembly. The connection junctions are subject to damage during molding in the plastic or other insulating material—particularly upon insertion of the element into a mold, and subsequent injection molding of plastic components therearound. Unless substantial care is used in placing the thin secondary wire, and the substantially heavier and massive contact element, insufficient connection, wire breakage, and open circuits may occur. The reject rate of such elements, therefore, is comparatively high.

THE INVENTION

It is an object to provide a contact terminal arrangement for the high-voltage end of the secondary winding of an ignition coil, and especially of the ignition coil of a magneto armature, which is simple to make and does not require soldering, brazing or welding connections.

Briefly, the tubular cable receiving stub is formed with a through-opening, perferably of conically contacting shape in the region beyond the cable connection. The contact means comprises a metallic plug element fitted into and securely in the tubular end portion, for example of matching conical shape, and having means for preventing rotation with respect to the end portion, for example a flattened end, a knurled surface, ridges or the like. The secondary of the ignition coil has a wire end portion which is merely placed within the open tubular end portion of the stub, prior to insertion of the metallic plug element, electrical connection being effected by the clamping or squeezing connection between the wire end portion and the plug.

Preferably, the wire end portion, before being placed into the tubular end, is twisted together. It may be pretinned, so as to insure a good contact electrical connection. It need not be tinned, however, and the end may be left in its original state. The secondary, usually, is insulated magnet wire and, if the metallic plug element has a rough surface, for example by being formed with ridges, slight saw-tooth edges, knurled surfaces or the like, the roughness of the surface of the plug will bite through the insulation of the wire to establish a good electrical connection. The electrical connection is further insured by the insertion movement of the plug element; in accordance with a feature of the invention, the wire is first placed into the opening, and then plug element then pushed thereagainst. The formation with ridges, saw-tooth edges and the like, thereby insures scraping off of the insulating enamel coating and a good electrical connection. In a final manufacturing step, the end portion can then be jacketed with plastic material, for example by injection molding. Since the electrical wire is not soldered, breakage at junctions is effectively prevented, while an additional manufacturing step is eliminated.

The arrangement is inexpensive to make, while providing a more reliable connection due to the absence of solder, brazing or welding joints. Substantial simplification of manufacture is also obtained since the connection of the high-voltage end of the secondary winding with the contacting element, and insertion of the contacting element within the connecting stub is done in the same working step, due to the surface engagement of the wire with the plug element upon fitting the plug element into the open end portion of the connecting stub. In accordance with a preferred embodiment of the invention, the end portion is conically converging, and the plug is a conical plug which, after jacketing with plastic material at the end, reliably prevents removal of the plug, while additionally providing a strain connection of the plug within the stub upon connection of an ignition cable thereto. An automatic assembly machine can readily be arranged to place the wire in the opening and then insert the plug into the opening, fitted against the wire. Automatic insertion further reduces manufacturing costs.

In accordance with a preferred feature of the invention, the contact element is formed in bolt shape and has a forwardly projecting pin end, for example a threaded pin end, so that an ignition cable can be threaded on this pin end, the centered electrical conductor within the ignition making electrical connection with the pin end. The forward portion of this bolt-like plug is securely fitted in the rear opening of the connecting stub and, particularly if the plug is formed with a rearwardly projecting flattened end, it will be reliably retained within plastic material subsequently injected around the stub.

The assembly is particularly suitable for combination with a magneto ignition coil or armature, in which the wire from the secondary of the magneto is placed in the connecting stub, the plug then inserted, and thereafter the subassembly is jacketed with plastic material, thus relatively locating and insulating from each other the primary and secondary of the armature windings of the ignition coil, locating the assembly on the armature core, and providing a finished magneto assembly, complete with attachment holes and the like, and simultaneously also securing the spark plug connection bolt in place.

DRAWINGS

FIG. 1 is a fragmentary view of a magneto ignition arrangement for use with a small internal combustion (IC) engine; and FIG. 2 is a top view, partly in section, illustrating assembly of the wire, and the primary and secondary windings of the armature, as well as winding forms therefor, just before the connecting plug is inserted into the connection stub opening.

DETAILED DESCRIPTION

The invention will be described in connection with a magneto for a small 1-cylinder internal combustion (IC) engine, for example suitable for use with a lawn mower, a chain saw, or the like.

Figure 1:
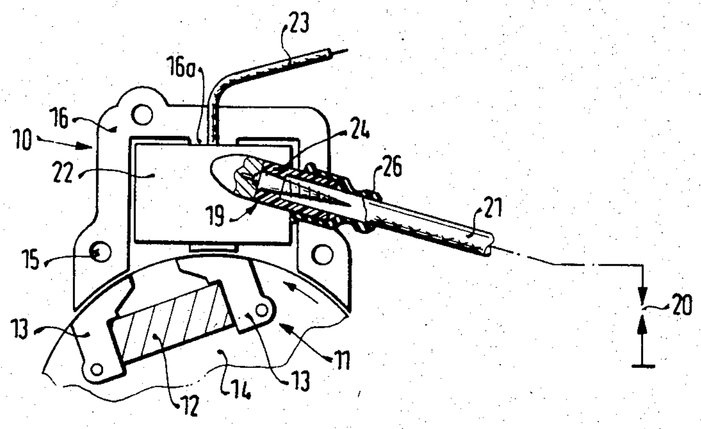

An ignition armature 10 is electromagnetically coupled to a rotary magnet system 11. The magnet system 11 has a permanent magnet 12 and two laterally projecting pole shoes 13. The permanent magnet 12 and the pole shoes 13 are located at the circumference of a rotary element of the IC engine, for example being embedded within the ventilating or fan wheel of the IC engine. FIG. 1 only shows a fraction of the fan wheel, namely that portion necessary for an understanding of the present invention. The rotary element 14 rotates within a pair of pole shoes of an armature 16 which, generally, is an E-shaped core, including a primary winding 17 (FIG. 2) and a secondary winding 18 surrounding the primary. The armature 10 is secured to the housing of the IC engine by screws or similar attachment elements extending through attachment holes 15. The armature 10 provides the ignition energy and simultaneously acts as ignition transformer or ignition coil to provide the high voltage necessary to obtain an ignition spark. The center leg 16*a* of the E-shaped core, therefore, has the primary and secondary windings 17, 18 located thereon, concentrically placed thereover. The secondary winding 18 has a high-voltage connecting terminal 19 which is adapted for electrical connection with a high-voltage ignition cable 21 to provide ignition energy to a spark plug 20, shown only schematically. Primary and secondary windings 17, 18 are potted within an insulating housing 22, together with further electronic circuit elements to provide ignition energy control to the ignition system—and not shown. Such additional elements can be placed on a printed circuit board, commonly potted or cast with the insulating housing 22. A conductor 23 is provided to permit grounding or connecting to chassis of the ignition system by a cut-off switch which grounds or short-circuits the primary winding in order to permit stopping of the IC engine.

Figure 2:
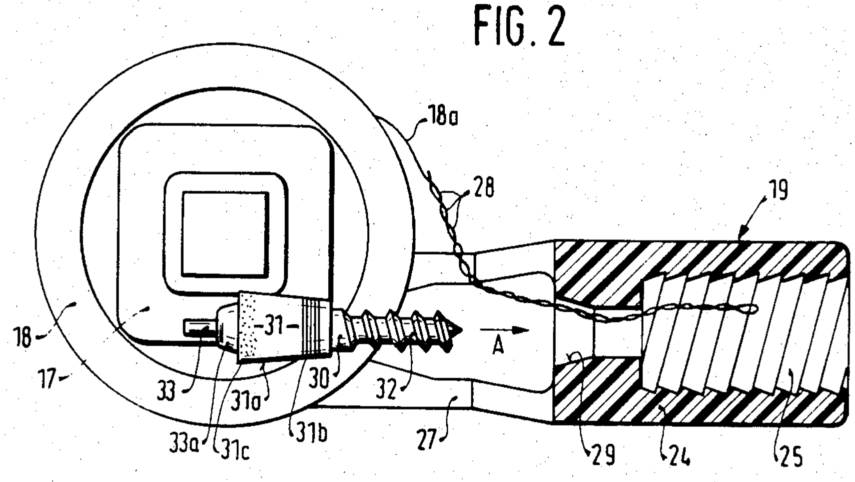

The high-voltage connection 19 of the secondary winding 18 includes a connecting stub 24 having a forward opening 25 The connecting end portion of the ignition cable 21 is screwed into the forward opening 25. A tap 26 can be placed over the connecting stub, and tightly fitting on the cable to exclude moisture. As best seen in FIG. 2, the connecting stub 24 is formed integrally with an injection molding carrier element 27, likewise made of insulating plastic material. The primary and secondary windings 17, 18, concentrically located above each other, are held in position in the carrier element 27 by suitable projections and recesses, which can be formed in the injection-molded body, or in other suitable manner, not shown.

In accordance with the present invention, the high-voltage end portion 18*a* of the secondary winding is not solder or weld-connected to a terminal. Rather, and in accordance with a feature of the invention, the secondary winding 18 is looped about itself and twisted together, and guided through an inner conically shaped opening 29 of the connecting stub 24 so that the wire extends within the outer opening 25. A contact plug 30, having a conical portion 31 fitting the conical end 29 of the connecting stub 19, is then inserted in the direction of the arrow A (FIG. 2) in the conical opening 29. Preferably, the plug 30 fits in the opening 29 by an interference or press fit. The contact bolt 30 thus, in one step, is reliably secured by its conical portion 31 in the conical bore 29 and, further, will form an electrical connection at the surface 31*a* with the twisted loops 28 at the end 18*a* of the secondary winding 18. The bolt-like plug 30 is made of a suitable electrically conductive metal. To insure good electrical connection between the twisted wire loops 28 at the end portion 18*a* of the secondary winding 18, the end portion 18*a* can be stripped of insulation and tinned. Upon insertion, the tinned end portions are pressed against a smooth surface 31*a* of the conical portion 31 of the contact plug 30.

After press-fitting the contact plug 30 within the conical bore 29 of the connecting stub 24, a leading pin-like end 32, preferably formed with threads thereon as shown, will extend within the outer opening 25 of the connecting stub 24, so that it can be screw-connected with the ignition cable 21—see FIG. 1.

The rear end of the contact plug 30 is formed with a flattened extension 33. After insertion, and the resulting clamp connection between the twisted ends 28 of the end portion 18*a* of the secondary winding, the insulating housing mass 22 is cast around the assembly, thus securely retaining the plug 30 in position, prevented from rotating by the flattened end 33. The plug 30, thus, will be embedded in the insulating compound, excluding possibility of corrosion between the wire 28 and the plug 30.

Various changes and modifications may be made. For example, the stub 24 need not be secured to the carrier 27; it can be directly secured to the housing 22, and injection-molded therewith in one step after insertion of the primary and secondary winding, and placement of a contact bolt or another similar and equivalent contact element in a pre-formed portion having the opening 29. The plug 30 may be secured against rotation in different ways. As an additional insurance against rotation, besides the flattened end portion 33, a rear portion is formed with longitudinal ridges 33*a*. Only a portion of the circumference 31 of the plug 30 is smooth. The remainder, at the trailing end, is knurled or stippled, that is, has a rough surface. At the leading end, the surface has ridges which preferably have comparatively sharp edges, for example in saw-tooth form, to bit into the wire 28. If the ridges are of sufficient roughness, it is not necessary to tin the wire end 18*a* forming the loops 28; rather, the shingled or saw-tooth ridges can be so arranged that they will bite through the thin enamel insulation customarily used on the magnet wire forming the secondary of an ignition coil. Upon insertion movement—see arrow A of FIG. 2—the insulation lacquer will be stripped, thus providing a secure electrical connection between the wire end portion 18*a* and the plug 30. The knurled portion 31*c*, as well as the saw-tooth shaped portion 31*b*, should be so arranged that the wire itself is not damaged, squeezed off or broken; rather, the extent of grooving or ridging and knurling should be merely such as to strip the insulation without detrimentally interfering with the strength of the wire which, usually, is made of copper. The seating of the plug 30 is additionally enhanced by the stippled or knurled surface 31*c* and the ridges 31*b*. It is not necessary that both the stippled and the ridged and the smooth surface be used; any one of the surfaces may be suitable.

The conical press fit between the bore 29 and the portion 31 of the contact plug 30 insures that the contact bolt 30 cannot be pulled out of the connecting stub 19, for example upon providing excessive pull or vibration on the ignition cable 21, or by unskilled disassembly. Other arrangements to prevent pulling out of the plug 30 in the direction of the arrow A, after having been seated in the stub 19, may be used.

Various other changes and modifications may be made within the scope of the inventive concept.

We claim:

1. In an ignition system for an internal combustion engine having an ignition coil (17, 18) and an ignition cable (21), a connection arrangement, from the thin wire of the secondary (18) of the ignition coil to the cable (21), having a tubular cable receiving stub (24), and contact means (30) located in the cable receiving stub for connection with an end portion of the ignition cable (21);

wherein, in accordance with the invention, the cable receiving stub is formed with a tubular inner end portion having a conical inner wall (29) which converges toward the end of said stub (24) into which said cable (21) is to be inserted;

the contact means comprises a metallic plug element (30), fitting into and securely seated within the tubular end portion, by means of a conical surface (31) matching and press-fitting within said conical inner wall (29), and having means for preventing rotation of said plug (30) with respect to the tubular end portion of the stub;

and the secondary of the ignition coil has a thin wire end portion (18*a*, 28*a*) which is located between the inner wall (29) of the tubular end portion of the cable receiving stub (19) and the metallic plug element (30), and is in electrical connection with the surface (31*a*, 31*b*, 31*c*) of said plug element, and clamped thereby within the tubular end portion (29) of the cable receiving stub (24).

2. Arrangement according to claim 1, wherein the wire end portion (18, 28*a*) comprises at least one wire loop, twisted together, integral with the secondary of the ignition coil.

3. Arrangement according to claim 1, wherein the metallic plug element (30) comprises a contact bolt having a pin-like extension (32) located within the tubular connecting stub, and adapted to engage within the end portion of the ignition cable (21);

and intermediate portion (31) fitted within the tubular end portion of the connecting stub;

and a terminal end portion (33) formed in rotation-preventing shape;

and wherein a casting or potting compound is provided surrounding the primary and secondary windings (17, 18) of the ignition coil, and encapsulating said rotation-preventing shaped portion of the plug element; and securing said connecting stub in position.

4. Arrangement according to claim 3, wherein the rotation-preventing shape of the plug comprises a flattened end portion (33) thereof, embedded within said casting or potting compound.

5. Arrangement according to claim 3, wherein said rotation-preventing shape comprises a plurality of ridges (33*a*) formed at the end portion of the plug element (30) and embedded within said casting or potting compound.

6. Arrangement according to claim 1, wherein the wire end portion (18*a*, 28*a*) comprises pinned wire portions;

and said surface (31*a*) of the metallic plug element is smooth to provide for smooth surface engagement and electrical connection between the wire end portion and said plug element.

7. Arrangement according to claim 1, wherein said surface (31*b*) of the plug element is formed with ridges or saw-tooth like projections (31*b*), adapted to strip off and bite through an insulating coating on said wire end portion (18*a*, 28*a*).

8. Arrangement according to claim 1, including a support carrier (27) supporting the primary and secondary windings (17, 18) of the ignition coil;

and wherein the connecting stub (19) is molded on said support (27).

9. Arrangement according to claim 6, wherein the inner wall (29) of the tubular end portion is conical, converging towards the end in which the cable (21) is to be inserted;

and said plug element (30) includes a matching conical portion (31) press-fitting within said conical portion of the opening.

10. Arrangement according to claim 7, wherein the inner wall (29) of the tubular end portion is conical, coverging towards the end in which the cable (21) is to be inserted;

and said plug element (30) includes a matching conical portion (31) press-fitting within said conical portion of the opening.

11. Arrangement according to claim 1, wherein a portion (31*c*) of the surface of said conical plug surface 31 is stippled or knurled.

12. Arrangement according to claim 7, wherein a portion (31*c*) of the surface of said conical plug surface 31 is stippled or knurled.

* * * * *